Jan. 31, 1928.
M. R. LYNDS
1,657,721
JUICE EXTRACTOR
Original Filed Aug. 11, 1926
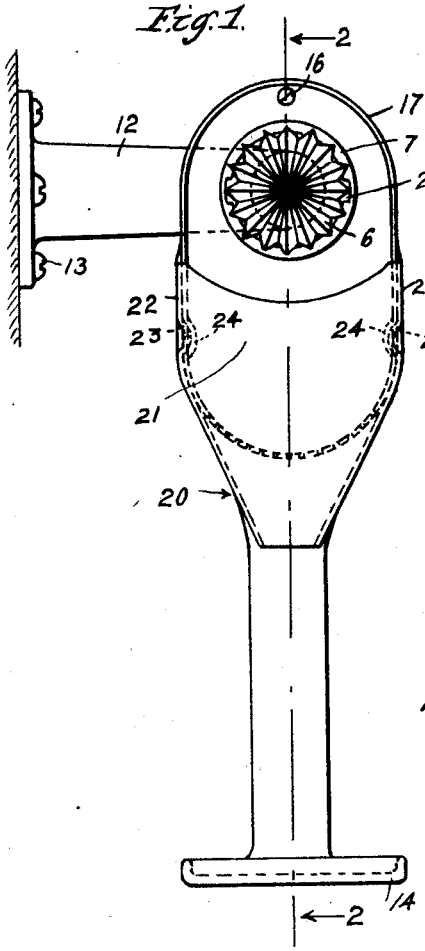
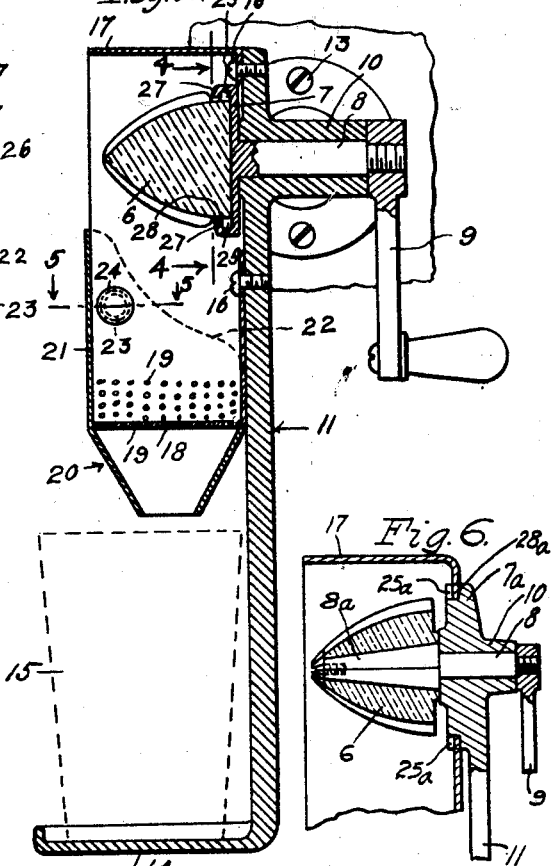
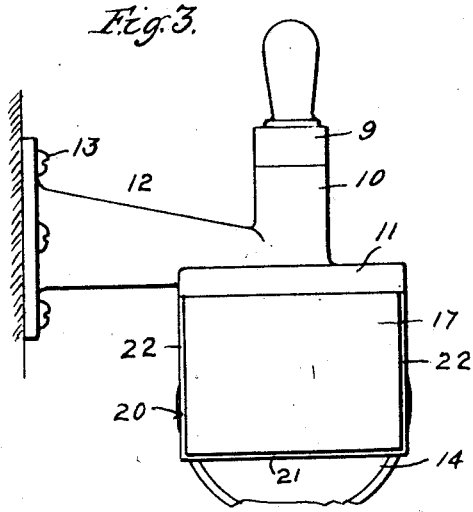
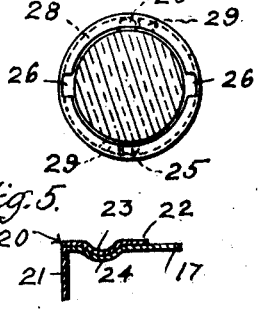
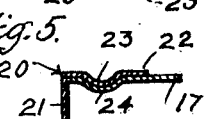
INVENTOR.
Mabel R. Lynds
BY
Robt. W. Pearson
ATTORNEY.

Patented Jan. 31, 1928.

1,657,721

UNITED STATES PATENT OFFICE.

MABEL R. LYNDS, OF LONG BEACH, CALIFORNIA.

JUICE EXTRACTOR.

Application filed August 11, 1926, Serial No. 128,604. Renewed October 18, 1927.

My invention relates to fruit juice extractors designed for the purpose of conveniently and expeditiously extracting the juice from deciduous fruits such as oranges, lemons, grape fruit and the like.

The object of my invention is to provide an apparatus for the above recited purpose which will be simple of construction, easily operated and which may be readily taken apart and conveniently and thoroughly cleaned.

Another object of the invention is to provide an apparatus whereby the rind, the pulp and the juice may be separated, one from the other and individually preserved for future or present use.

Other objects of the invention will be disclosed in the following description, and exemplified in the drawings; in which:

Figure 1 is a front view of the apparatus.

Figure 2 is a section through the same taken on the line 2—2 of Figure 1 viewed in the direction indicated by the arrows.

Figure 3 is a plan view.

Figure 4 is a section taken on the line 4—4 of Figure 2.

Figure 5 is a fragmental section taken on the line 5—5 of Figure 2.

Figure 6 is a fragmental section taken on line 2—2 of Figure 1 showing a modified form of the apparatus.

In carrying out my invention I employ a reamer head 6 which is formed of glass or some other non-corrodible material, said head being detachably engaged with a disc 7 having a shaft 8 formed thereon which is provided with a suitable crank 9.

The shaft 8 is journaled in a bearing 10 which is formed on a base comprising bracket 11, said bracket being provided with an arm 12 which may be secured to the wall or partition by means of screws 13; and an outwardly projecting table 14 upon which the juice receiving receptacle 15 (shown in dotted lines) may rest to receive the juice while being extracted.

Secured to the bracket 11 by means of the screws 16, or otherwise, is a casing or guard 17 into which the reamer head 6 projects, said guard being preferably formed of sheet metal and being open at its front to permit of the insertion of the fruit by the operator, and provided with curved flanged walls at both top and bottom, the bottom flange 18 having formed therein the perforations 19 through which the juice passes into the receptacle 15 and is strained during this operation.

In order that the juice may be conveniently directed into the receptacle a funnel 20 is provided, which fits closely to the casing or guard 17 and is detachably secured thereto, as shown, said funnel having a front wall 21 and side walls 22, the wall 21 being adapted to close the front of guard 17, and the side walls having formed therein, the snap buttons 23 adapted to engage with the depression 24 formed in the casing or guard, thus providing a quick method of attaching or detaching the funnel from the casing.

In order that the reamer 6 may be quickly attached and detached from the disc 7, the reamer is provided with the lugs 25, which may be inserted into the notches 26 formed in a flange 27 of the disc and then given a twist whereby said lugs will be engaged in a groove 28 formed by said flange and locked thereto from lateral movement. In order that the reamer may be caused to rotate with the disc, the lugs 25 are adapted to engage with lugs 29 or other suitable obstructions formed in the groove 28.

In operating the apparatus, the fruit is first halved, the operator presses one of the sections of fruit to the reamer and at the same time turns the crank 9. This operation grinds the pulp from the rind which in turn drops to the perforated bottom of the casing. The juice of the fruit passes through the perforation 18 and is then directed by the funnel 20 into the receptacle 15. The rind remains in the operator's hand and the pulp in the bottom of the casing may be disposed of at the discretion of the operator.

In the modified form of my invention shown in Figure 6 the reamer head 6 is detachably mounted on a square tapered shank $8^a$, and the guard 17 is detachably secured to the disc $7^a$ by the lugs $25^a$ in the groove $28^a$, in a similar manner as shown in Figure 2 when connected to the said disc 7.

Having thus described my invention what I claim is:

1. A juice extractor comprising a base adapted to be secured to a wall, a rotatable reamer journaled in said base; a guard adapted to surround said reamer and to be detachably secured to said base and having a strainer formed in its bottom; and a receptacle holding table secured to said base.

2. A juice extractor comprising a base; a rotatable reamer journaled in said base; a guard for said reamer having a strainer formed in its bottom; a funnel detachably connected to said guard; and a receptacle holding table secured to said base.

In testimony whereof I affix my signature.

MABEL R. LYNDS.